United States Patent [19]

Schmidt, Jr. et al.

[11] Patent Number: 4,578,302

[45] Date of Patent: Mar. 25, 1986

[54] REINFORCED TAPE LAMINATES

[75] Inventors: Robert C. Schmidt, Jr., Port Murray; Paul P. Puletti, Glen Gardner, both of N.J.

[73] Assignee: National Starch and Chemical Corporation, Bridgewater, N.J.

[21] Appl. No.: 749,341

[22] Filed: Jun. 27, 1985

[51] Int. Cl.$^4$ .............................................. B32B 5/12
[52] U.S. Cl. .................................... 428/110; 156/295; 156/334; 428/246; 428/247; 428/251; 428/284; 428/285; 428/511; 428/517
[58] Field of Search ............... 428/110, 247, 246, 251, 428/284, 285, 280, 282, 517, 511; 156/295, 334; 527/603; 524/68, 77

[56]     References Cited

U.S. PATENT DOCUMENTS 4,526,577  7/1985  Schmidt et al. ..................... 428/198

Primary Examiner—James J. Bell
Attorney, Agent, or Firm—Ellen T. Dec; Edwin M. Szala

[57]     ABSTRACT

Fiber reinforced tape laminates characterized by superior strength properties are prepared utilizing a hot melt pressure sensitive adhesive comprising a styrene-butadiene block or multi-block copolymer, a tackifying resin and an oil.

20 Claims, No Drawings

REINFORCED TAPE LAMINATES

BACKGROUND OF THE INVENTION

The present invention relates to reinforced tape laminates and especially to glass fiber reinforced gummed tape laminates.

The use of fibers, particularly glass fibers, to reinforce gummed tapes has long been accepted as a method for substantially increasing the tear strength of the tape. Such tape laminates are typically formed by applying an adhesive to the base sheet, laying on the fiber, then applying a top sheet and pressing the laminate through a pair of squeeze rolls. The tape is generally completed by applying an adhesive to one of the outer surfaces to form a gummed or prepasted coating although, in some instances, one of the sheets may be precoated prior to formation of the laminate.

The requirements for the adhesive used in forming the laminate are stringent and include excellent paper adhesion as well as good specific adhesion to the fibers in order to give an overall strong construction. While the latter are the principal requirements, the adhesive must also possess heat and oxidation resistance, low temperature flexibility and must not bleed through the paper substrates. Originally, the adhesive used in producing the laminate were aqueous vinyl acetate based adhesive. More recently, however, tape manufacturers have switched to hot melt adhesives, most commonly those based on atactic polypropylene.

SUMMARY OF THE INVENTION

We have now found that pressure sensitive hot melt adhesives prepared from A—B—A type block and multi-block copolymers are particularly useful in the construction of reinforced gummed tape laminates.

Thus, the present invention is directed to a reinforced gummed tape laminate comprising fibers bonded between two substrates, using a hot melt pressure sensitive adhesive composition comprising:

(a) 10 to 35% by weight of an A—B—A block or multi-block copolymer where the A component is styrene and the B component is butadiene or hydrogenated butadiene and the A component comprises at least 28 parts per 100 parts of the copolymer;

(b) 45 to 70% by weight of a compatible tackifying resin;

(c) 5 to 30% by weight of a plasticizing oil;

(d) 0 to 5% by weight of a petroleum derived wax; and (e) 0.1 to 2% by weight of a stabilizer.

More particularly, the present invention is directed to the use of a hot melt adhesive composition especially adapted for the above described laminate, the hot melt adhesives containing as the block copolymer, a multi-block styrene-butadiene copolymer containing at least 35 parts styrene per 100 parts copolymer.

DETAILED DESCRIPTION OF THE PREFERRED EMBODIMENTS

The primary component of the adhesive compositions used in the present invention are block or multi-block copolymers having the general configuration:

A—B—A or A—B—A—B—A—B— wherein the non-elastomeric polymer blocks A are styrene, while the elastomeric polymer blocks B are butadiene or butadiene which is partially or substantially hydrogenated. They may be linear or branched. Typical branched structures contain an elastomeric portion with at least three branches which can radiate out from a central hub or can be otherwise coupled together.

The non-elastomeric styrene blocks should make up 28 to about 75% by weight of the block copolymer. The elastomeric block component making up the remainder of the copolymer is butadiene which may or may not be hydrogenated as taught, for example, in U.S. Pat. No. 3,700,633. This hydrogenation may be either partial or substantially complete. Selected conditions may be employed, for example, to hydrogenate the elastomeric butadiene block while not so modifying the vinyl arene polymer blocks. Other conditions may be chosen to hydrogenate substantially uniformly along the polymer chain, both the elastomeric and non-elastomeric blocks thereof being hydrogenated to practically the same extent, which may be either partially or substantially complete.

Typical of the rubbery block copolymers useful herein are the polystyrene-polybutadiene-polystyrene, and e.g., polystyrene-poly-(ethylenebutylene)-polystyrene. These copolymers may be prepared using methods taught, for example, in U.S. Pat. Nos. 2,239,478; 3,427,269; 3,700,633; 3,753,936; and 9,932,327. Alternatively, some may be obtained from Shell Chemical Co. under the trademarks Kraton 1101, 1102, 1650, and 1652, and from Phillips Chemical Co. under trademarks Solprene 418 and 423. These block copolymers are used at levels of 10 to 35% by weight of the adhesive, preferably 15 to 35% by weight.

Most preferred for use herein are the linear A—B—A—B—A multi-block copolymers where the elastomeric block is butadiene and the non-elastomeric block is styrene and the latter is present in relatively high concentrations, i.e., at levels of 35% or above. Block copolymers marketed commercially at this time which meet the above described requirements are available from Firestone under the tradename Stereon 840A (57 parts butadiene and 43 parts styrene). Blends of these high styrene containing copolymers with other compatible block copolymers may also be employed.

The tackifying resins useful in the adhesive compositions can be hydrocarbon resins, synthetic polyterpenes, rosin esters, natural terpenes, and the like. More particularly, the useful tackifying resins include any compatible resins or mixtures thereof such as (1) natural and modified rosins such, for example, as gum rosin, wood resin, tall-oil rosin, distilled rosin, hydrogenated rosin, dimerized rosin, and polymerized rosin; (2) glycerol and pentaerythritol esters of natural and modified rosins, such for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) copolymers and terpolymers of natured terpenes, e.g., styrene/terpene and alpha methyl styrene/terpene; (4) polyterpene resins having a softening point, as determined by ASTM method E28-58T, of from about 80° to 150° C.; the latter polyterpene resins generally resulting from the polymerization of terpene hydrocarbons, such as the cicyclic monoterpene known as pinene, in the presence of Friedel-Crafts catalysts at moderately low temperatures; also included are hydrogenated polyterpene resins; (5) phenolic modified terpene resins and hydrogenated derivatives thereof such, for example, as the resin product resulting from the condensation, in an acidic medium, of a bicyclic terpene and a phenol; (6) aliphatic petroleum hydrocarbon resins having a Ball and Ring softening point of from about 70° to 135° C.; the latter resins resulting from the polymerization of monomers consisting primarily of olefins and diolefins; also included are the hydrogenated aliphatic petroleum hydrocarbon resins; (7) aromatic petroleum hydrocarbon resins and the hydrogenated derivatives thereof; and (8) alicyclic petroleum hydrocarbon resins and the hydrogenated derivatives thereof. Mixtures of two or more of the above described tackifying resins may be required for some formulations.

The selection of the particular tackifying agent is, in large part, dependent upon the specific block copolymer employed. The preferred adhesive formulations for use herein which employ the linear multi-block Stereon type copolymers provide optimum properties when tackifiers of modified terpene having ring and ball softening point of about 100°-120° C. such as Zonatac 105, are employed.

Among the applicable stabilizers or antioxidants utilized herein are included high molecular weight hindered phenols and multifunctional phenols such as sulfur and phosphorous-containing phenols. Hindered phenols are well known to those skilled in the art and may be characterized as phenolic compounds which also contain sterically bulky radicals in close proximity to the phenolic hydroxyl group thereof. In particular, tertiary butyl groups generally are substituted into the benzene ring in at least one of the ortho positions relative to the phenolic hydroxy group. The presence of these sterically bulky substituted radicals in the vicinity of the hydroxyl group serves to retard its stretching frequency, and correspondingly, its reactivity; this steric hindrance thus providing the phenolic compound with its stabilizing properties. Representative hindered phenols include: 1,3,5-trimethyl 2,4,6-tris (3,5-di-tert-butyl-4-hydroxybenzyl)benzene; pentaerythrityl tetrakis-3(3,5-di-tert-butyl-4-hydroxyphenyl)propionate; n-octadecyl-3(3,5-di-tert-butyl-4-hydroxyphenyl)-propionate; 4,4'-methylenebis (2,6-tert-butylphenol); 4,4'-thiobis (6-tert-butyl-o-cresol); 2,6-di-tertbutylphenol; 6-(4-hydroxyphenoxy)-2,4-bis(n-octyl-thio)-1,3,5-triazine; di-n-octadecyl 3,5-di-tert-butyl-4-hydroxy-benzyl-phosphonate; 2-(n-octylthio)ethyl 3,5-di-tert-butyl-4-hydroxy-benzoate; and sorbitol hexa[3-(3,5,-di-tert-butyl-4-hydroxyphenyl)-propionate].

The performance of these antioxidants may be further enhanced by utilizing, in conjunction therewith, known synergists such, for example, as thiodipropionate esters and phosphites. Particularly useful is distearylthiodipropionate.

These stabilizers, if used, are generally present in amounts of about 0.1 to 1.5 weight percent, preferably 0.25 to 1.0%.

Various placticizing or extending oils are also present in the composition in amounts of 5% to about 30%, preferably 5 to 25% by weight in order to provide wetting action and/or viscosity control. The above broadly includes not only the usual plasticizing oils but also contemplates the use of olefin oligomers and low molecular weight polymers as well as vegetable and animal oil and their derivatives. The petroleum derived oils which may be employed, are relatively high boiling materials containing only a minor proportion of aromatic hydrocarbons (preferably less than 30% and, more particularly, less than 15% by weight of the oil). Alternatively, the oil may be totally non-aromatic. The oligomers may be polypropylenes, polybutenes, hydrogenaged polyisoprene, hydrogenated polybutadiene, or the like, having average molecular weights between about 350 and about 10,000. Vegetable and animal oils include glyceryl esters of the usual fatty acids and polymerization products thereof.

Various petroleum derived waxes may also be used in amounts less than about 15% by weight of the composition in order to impart fluidity in the molten condition of the adhesive and flexibility to the set adhesive, and to serve as a wetting agent for bonding cellulosic fibers. The term "petroleum derived wax" includes both paraffin and microcrystalline waxes having melting points within the range of 130°-225° F. as well as synthetic waxes such as low molecular weight polyethylene or Fisher-Tropsch waxes.

Other additives conventionally used in hot melt adhesives for reinforced tape laminates including clay, diatomaceous earth, barium sulfate, calcium carbonate, talc, colloidal silica, etc. may also be present in these adhesives.

The adhesive compositions are prepared by blending the components in the melt at a temperature of about 130°-200° C. until a homogeneous blend is obtained, approximately two hours. Various methods of blending are known to the art and any method that produces a homogeneous blend is satisfactory.

The resultant adhesives are then used to bond the fibers between the two substrates using conventional techniques. Most commonly the reinforcing fibers are glass fibers which, in some cases, may be starch coated. The fibers may be laid directly in random or predetermined configurations on the adhesive coated base substrate or they may be laid on in the form of a prefabricated scrim web. The base substrates are usually formed from kraft paper having a weight of 30 to 40 pounds per 300 sq. ft. ream.

The laminate is generally formed by applying the hot melt adhesive to a continuous layer of the base sheet at a temperature of about 250° to 350° F. and a coating thickness of 0.001 to 0.002 inches (equivalent to a coating weight of approximately 15–30 pounds per 3000 sq. ft. ream). This coating is performed on a roll or extrusion coater run at a speed of about 200–1000 feet per minute. The fibers or scrim are laid down on the coated substrate and a top sheet applied therein. The resultant laminate is then pressed to form a board, usually by passing through a pair of squeeze rolls.

If desired, one surface of one of the substrates may be precoated with an adhesive prior to lamination. Alternatively, an adhesive coating may be applied to one of the outer surfaces after formation of the laminate. Any remoistenable or pressure sensitive adhesive used in conventional gummed tape manufacture may be utilized.

This invention can be further illustrated by the following examples or preferred embodiments thereof, although it will be understood that these examples are included merely for purposes of illustration and are not intended to limit the scope of the invention unless otherwise specifically indicated.

Testing Procedures

Studies on reinforced tapes have indicated that two of the most stringent requirements for the adhesive are the ability to adhere the two substrates as well as the ability to adhere the fibers. Therefore, in testing the tapes of the present invention, the following tests were performed:

180° Peel Test (Kraft to Kraft): A thin coating of adhesive was applied to one kraft substrate and a second kraft substrate laminated thereon. Uncoated tabs left at one end of each substrate, were screwed into the jaws of an Instrom tester and the laminate peeled at a crosshead separation speed of two inches per minute. The force required to pull the substrates apart was recorded.

FIber Retention Strength: Glass fibers were laminated lengthwise between two layers of kraft with a portion of the fibers extending beyond the laminated construction. The laminated portion was cut to one inch. The fibers were then pulled out, one at a time, using a tensile tester with jaw separation speed of two inches per minute. The force required to pull out each one inch bonded length of fiber was recorded.

EXAMPLE I

Ten parts process oil (Shellflex 371N) and 0.5 parts trionylphenyl phosphite oxidant were blended with 20 parts Stereon 840A at 325° F. When the blend was homogeneous, 20 additional parts oil were added followed by 50 parts Permalyn 105, a pentaerythritol ester of rosin tackifier. The resulting pressure sensitive adhesive was designated Adhesive A.

The adhesive was compared, using the tests described above, with a tackifying resin fortified atactic polypropylene adhesive presently employed in the commercial production of reinforced tapes.

The peel strength of Adhesive A was 3.5 pounds per linear inch per mil of adhesive compared with 2.9 pounds for the atactic polypropylene. The fiber retention test gave a strength value of 8.0 pounds per linear inch for Adhesive A contrasted with 6.2 pounds for the atactic polypropylene.

In a similar manner, other adhesives can be prepared utilizing, for example, Kraton G 1652, Kraton 1102. Kraton 1101, and Kraton 1650 as well as a variety of other tackifying resins. In all cases, the resultant adhesives should be useful in prepared fiber reinforced gummed tape laminates characterized by superior tensile strength property.

Now that the preferred embodiments of the present invention have been described in detail, various modifications and improvements thereon will become readily apparent to those skilled in the art. Accordingly, the spirit and scope of the present invention is to be limited only by appended claims, and not by the foregoing disclosure.

We claim:

1. A reinforced gummed tape laminate comprising fibers bonded between two substrates using a hot melt pressure sensitive adhesive composition comprising:
   (a) 10 to 35% by weight of an A—B—A block or A—B—A—B—A— multi-block copolymer where the A component is styrene and the B component is butadiene or hydrogenated butadiene and wherein the A components comprise at least 28 parts per hundred parts copolymer;
   (b) 45 to 70% by weight of a compatible tackifying resin;
   (c) 5 to 30% by weight of a plasticizing oil;
   (d) 0 to 5% by weight of a petroleum derived wax; and
   (e) 0.1 to 2% by weight of a stabilizer.

2. The laminate of claim 1 wherein the tackifying resin is any compatible resin or mixture thereof selected from the group consisting of (1) natural and modified rosins; (2) glycerol and pentaerythritol esters of natural and modified rosins; (3) copolymers and terpolymers of natured terpenes; (4) polyterpene resins having a softening point, as determined by ASTM method E28-58T, of from about 80° to 150° C.; (5) phenolic modified terpene resins and hydrogenated derivatives thereof; (6) aliphatic petroleum hydrocarbon resins having a Ball and Ring softening point of from about 70° to 135° C.; (7) aromatic petroleum hydrocarbon resins and the hydrogenated derivatives thereof; and (8) alicyclic petroleum hydrocarbon resins and the hydrogenated derivatives thereof.

3. The laminate of claim 1 wherein the fiber is glass.

4. The laminate of claim 1 wherein the substrate is kraft paper.

5. The laminate of claim 1 wherein the fiber is laid between the substrates in the form of a scrim web.

6. A reinforced gummed tape laminate comprising fibers bonded between two substrates using a hot melt pressure sensitive adhesive composition comprising:
   (a) 10 to 35% by weight of an A—B—A—B—A—B— multi-block copolymer wherein the A component is styrene and the B component is butadiene and wherein the styrene component is present in an amount of at least 35 parts per 100 parts of the copolymer;
   (b) 45 to 70% by weight of a compatible tackifying resin;
   (c) 5 to 30% by weight of a plasticizing oil;
   (d) 0 to 5% by weight of a petroleum derived wax; and
   (e) 0.1 to 2% by weight of a stabilizer.

7. The laminate of claim 6 wherein the block copolymer comprises 57 partsbutadiene and 43 parts styrene.

8. The laminate of claim 6 wherein the tackifying resin is any compatible resin or mixture thereof selected from the group consisting of (1) natural and modified rosins; (2) glycerol and pentaerythritol esters of natural and modified rosins; (3) copolymers and terpolymers of natured terpenes; (4) polyterpene resins having a softening point, as determined by ASTM method E28-58T, of from about 80° to 150° C.; (5) phenolic modified terpene resins and hydrogenated derivatives thereof; (6) aliphatic petroleum hydrocarbon resins having a Ball and Ring softening point of from about 70° to 135° C.; (7) aromatic petroleum hydrocarbon resins and the hydrogenated derivatives thereof; and (8) alicyclic petroleum hydrocarbon resins and the hydrogenated derivatives thereof.

9. The laminate of claim 8 wherein the tackifying resin is a modified terpene resin having a Ring and Ball softening point of about 100°–120° C.

10. The laminate of claim 8 wherein the tackifying resin is an aromatic petroleum hydrocarbon resin and hydrogenated derivative thereof.

11. The laminate of claim 6 wherein the fiber is glass.

12. The laminate of claim 6 wherein the substrate is kraft paper.

13. The laminate of claim 6 wherein the fiber is laid between the substrates in the form of a scrim web.

14. A process for forming reinforced tapes comprising the steps of:
(i) applying to a base sheet a hot melt adhesive composition comprising:
(a) 10 to 35% by weight of an A—B—A block or A—B—A—B—A— multi-block copolymer where the A component is styrene and the B component is butadiene or hydrogenated butadiene and wherein the A components comprise at least 28 parts per hundred parts copolymer;
(b) 45 to 70% by weight of a compatible tackifying resin;
(c) 5 to 30% by weight of a plasticizing oil;
(d) 0 to 5% by weight of a petroleum derived wax; and
(e) 0.1 to 2% by weight of a stabilizer;
(ii) laying a plurality of fibers on said adhesive coated substrate;
(iii) apply a top sheet to form a laminate; and
(iv) pressing the laminate through a pair of squeeze rolls.

15. The process of claim 14 wherein an outer surface of the laminate is coated with an adhesive to form a gummed or prepasted coating.

16. The process of claim 14 wherein the styrene content of the block copolymer is at least 35 parts per 100 parts of the copolymer.

17. The process of claim 16 wherein the block copolymer comprises 47 parts butadiene and 43 parts styrene.

18. The process of claim 14 wherein the fiber is glass.

19. The process of claim 14 wherein the substrate is kraft paper.

20. The process of claim 14 wherein the fiber is laid between the substrates in the form of a scrim web.

* * * * *